Dec. 10, 1946.  L. J. CAREY  2,412,319
ARM DRIVING MECHANISM
Filed Nov. 22, 1943  2 Sheets-Sheet 1
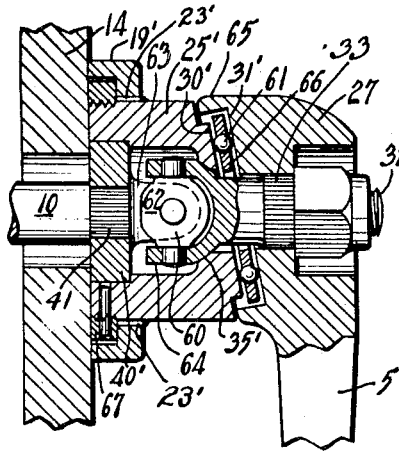
Fig.-5
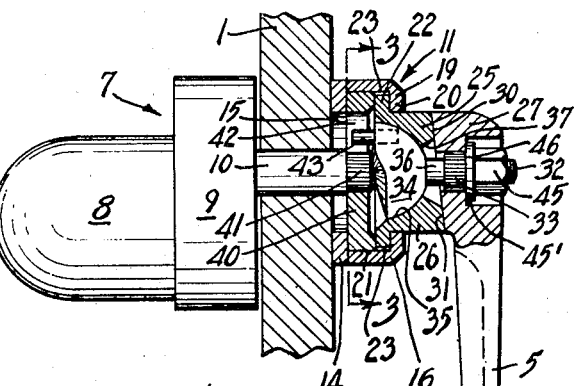
Fig.-1
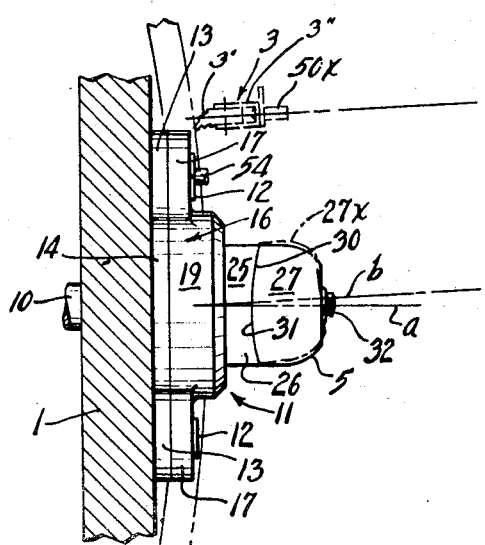
Fig.-2
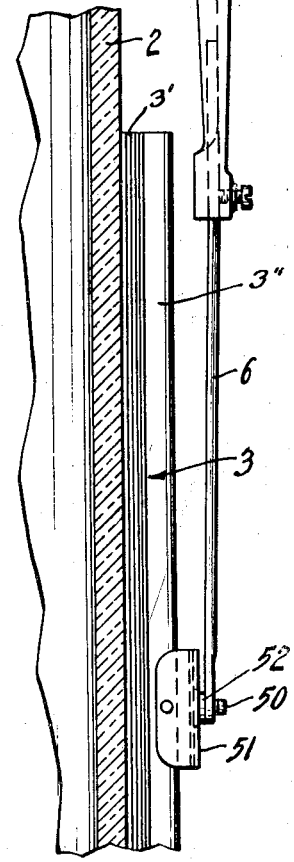
INVENTOR.
LEROY J. CAREY
BY George M. Soule
ATTORNEY

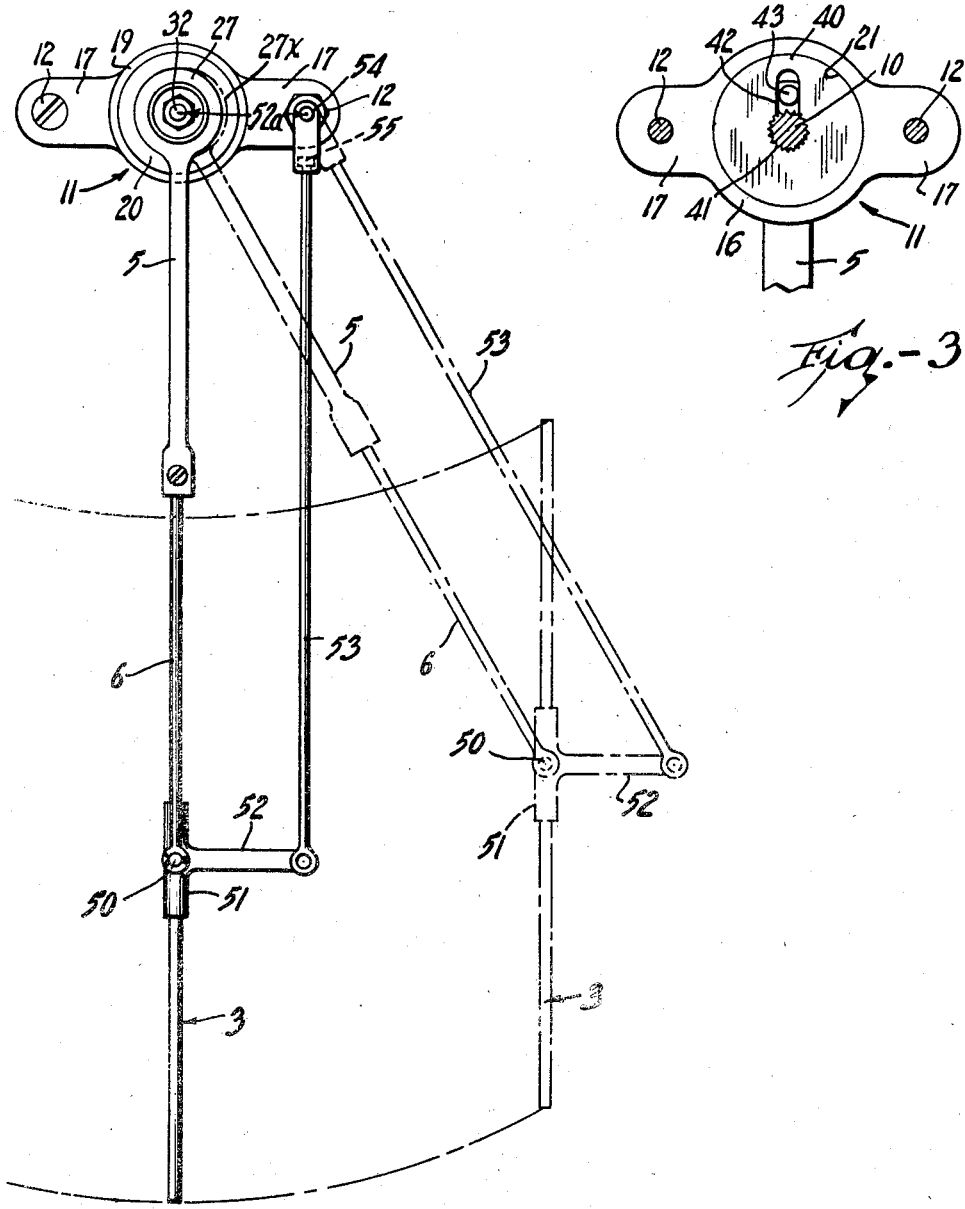

Patented Dec. 10, 1946

2,412,319

UNITED STATES PATENT OFFICE 2,412,319

ARM DRIVING MECHANISM

Leroy J. Carey, Cleveland, Ohio, assignor to The Marquette Metal Products Company, Cleveland, Ohio, a corporation of Ohio Application November 22, 1943, Serial No. 511,266

10 Claims. (Cl. 15—253)

This invention relates to an arm driving means, one practical use of which is to cause a wiping element, as of a window, windshield or other wiper, to be guided for movement in an arcuate path transverse to the plane of swinging movement of the wiper. The above indicates the general object.

A specific object is to provide an improved manner of supporting a drive arm of a wiper element in such manner that said element will wipe a surface of predetermined curvature with uniform or substantially uniform pressure over the entire portion of the surface with which the wiper element makes contact.

Another object is to provide a supporting and operating mechanism for a drive arm of a wiper element arranged to wipe a curved surface, by which mechanism a support for said wiper element is held in a substantially uniform operating position or attitude with respect to such curved surface.

Still another object is to provide a simple pivotal driving mechanism for a wiper arm operative to cause a free end of the arm to move positively in a desired curve transverse to the plane of swinging movement of the arm, which mechanism may be mounted substantially entirely in exposed position (as externally of an aircraft or other vehicle body) without likelihood of becoming impaired or rendered inefficient by accumulations of ice or other foreign matter likely to be encountered in such exposed position.

A further object is to provide an arm driving mechanism for uses such as mentioned above in which the arm can be easily adjusted for oscillating or other rotary movement over the different areas adjacent and around the mounting for the arm, and/or by or with which mechanism either concave or convexly curved surfaces may be effectively wiped in a uniform or desired manner.

Still another object is to provide a driving mechanism for a wiper adapted to traverse a curved surface whereby the general plane of the surface to be wiped can be used as a reference for accurately predetermining without difficult computation or trial "mock up" the proper position of a wiper drive shaft.

The illustrated forms and proposed uses for the present invention are by way of example only. Terms such as vertical, horizontal, front, rear, etc., used either in the description or claims are for convenience and not by way of limitation.

In the drawings,

Fig. 1 is a vertical sectional and elevational view of a wiper driving mechanism assembly and associated fragmentary parts of a supporting body such as a vehicle;

Fig. 2 is a plan view of the mechanism and apparatus of Fig. 1;

Fig. 3 is a sectional view taken as indicated at 3—3 on Fig. 1;

Fig. 4 is a front elevational view of the mechanism and apparatus of Fig. 1 and shows additionally and partly diagrammatically, a wiper guiding pantograph mechanism;

Fig. 5 is a view corresponding generally to the upper part of Fig. 1 but showing, in a somewhat larger scale, a modified construction.

Windshield and other surface wiper driving mechanisms for operating upon curved surfaces are of several types. Probably the simplest in construction is that in which, by obliquely positioning a drive shaft for a wiper element supporting arm with reference to the principal plane of the curved surface, the wiper is caused to follow the curve although the shaft axis is fixed and the arm not materially flexed in a plane perpendicular to such principal plane. Another type employs yielding wiping-pressure-maintaining means whereby the wiper can follow the curved surface without departing from it even though the wiper is not positively guided by the driving or supporting means in a manner such that the wiper will be caused to follow the curve. Still another type employs a cam to swing the wiper supporting arm positively in the desired curved path. Some types are combinations of those mentioned.

In the first type mentioned above, the attitude of the wiper supporting portion of the drive arm changes progressively to a marked degree relative to the surface to be wiped, as the arm is moved in either direction from an initial position. Furthermore, very difficult computations are involved in determining the obliquity of the drive shaft and, usually, further difficulties experienced in installing the shaft and associated parts in the necessary positions for proper operation. The second type obviously is subject to inefficiency and excessive wear, while traversing portions of a surface if adequate wiping force is to be maintained at other portions; and the applicability of this type is limited to very gradual curves. The third type has the same limitation as first mentioned above in respect to the first type discussed, and usually requires exposed relatively moving parts likely to become inoperative or at least inefficient in event of accumulation of ice and other foreign matter thereon. Usually said third type is complicated in construction and difficult to maintain in proper condition for operation under adverse conditions. The present arrangement and construction embodies most of the desirable features of all three types mentioned but without having the operating or installation disadvantage of any of them.

Referring to Figs. 1, 2 and 4, a body member 1 of, for instance a vehicle, has mounted thereon or associated therewith in a suitable manner a curved panel or window 2 to be wiped as by a wiper blade 3 shown in an intermediate or mid-stroke wiping position in full lines in Figs. 1 and 4. The body and panel 2 would ordinarily be in substantially the same plane—not offset from each other as shown.

The drive arm for the wiper blade is shown at 5 connected with said blade as by an extensible arm element 6 of any suitable form. The curved surface of the panel 2 presented to the wiper blade is cylindrically convex although by appropriate re-arrangement or modification of driving mechanism and/or blade any other regularly curved surface or curved surface with minor manufacturing irregularities may be operated upon by the mechanism hereof, e. g. conical or spheroidal, whether convex or concave.

An operating mechanism for the drive arm is shown at 7 comprising for example a motor 8 and motion converter 9 by which latter a drive shaft 10 in fixed position and extending through an opening in the wall 1 has alternate rotary motion imparted thereto.

Assuming the operating mechanism is inside the vehicle, the shaft 10, shown as projecting forwardly beyond the outer face of the wall 1, enters a casing 11 secured to said wall 1 and the housing of the operating mechanism 7 as by mounting bolts 12 extending through arm portions 13 of a mounting plate 14 forming a rear wall for the casing 11 and having an opening 15 around the shaft and spaced therefrom. A complementary forward casing section or attaching part 16 has arms 17 overlying the arms 13 of the mounting plate and receiving, for example, the head portions of the mounting bolts. Said section 16 has a generally cylindrical hollow central portion 19 terminating forwardly in an inwardly turned annular flange 20. The casing 11 could, of course, be made in one piece if desired, and may be modified considerably as to form.

The inner generally cylindrical bore 21 or chamber of the casing 11 receives, adjacent the flange 20 and retained thereby, a rearward flange 22 of a ramp or normally fixed cam member 25, the main or barrel part 26 of which may be of generally cylindrical form shown projecting forwardly from the casing 11. The barrel portion of the cam or ramp member 25 is axially aligned with the drive shaft; and, for enabling the barrel to be adjusted through small increments about such axis of alignment into various selected positions, a portion of the peripheral wall surface of the chamber 21 may be formed by closely spaced uniform serrations matching complementary external serrations, as at 23, on the flange 22 of the ramp or cam member.

The drive arm 5 has a generally circular head portion 27 which, in the position of the arm shown in full lines in Fig. 4, is in true alignment with the barrel portion of the ramp or cam member 25, and said head and barrel portion are maintained operatively in face to face contact along matching planar ramp or cam surfaces 30 and 31 of the member 25 and head 27 respectively. The planar surfaces are oblique to said axis of alignment. A central attaching bolt or stub shaft member 32 holds said planar surfaces in uniform operating relationship, e. g. mutual contact, at all times although allowing the surface 31 to move transverse to the axis of the bolt as the drive arm 5 is caused to rotate or oscillate by the mechanism 7. The inclination or obliquity of the matching planar surfaces of the ramp member 25 and the drive arm head 27 determines the path of movement of the free end of the wiper arm, hence the wiper or other work performing element carried by said drive arm. The motions and possible variations available will be further explained later herein.

The drive arm 5, as shown by Fig. 1, is coupled to the drive shaft 10 through the intermediary of the bolt or stub shaft 32. Said bolt, as shown, has a splined connection at 33 with a central bore of the head 27; and preferably the same type of serrations are used to form the spline as those at 23 connecting the flange 22 and casing section 19. The inner end of the bolt 32 has an enlarged, generally hemispherical head 34 formed on or rigidly attached to said bolt and operatively bearing on a mating spherical socket surface 35 formed, as shown, as an inner surface of the ramp member 25. A shank portion 36 of the bolt 32 passes through an enlarged opening 37 in said member 25 intersecting the ramp or cam surface 30 thereof and the socket.

The driving connection between the drive shaft 10 and bolt or stub shaft 32 includes, as also shown in Fig. 1, a drive plate or crank disc 40 supported for rotation in the circular chamber of the casing 11 for free turning movement and secured as by matching spline serrations 41 to a reduced end portion of the drive shaft. The drive plate 40 has a radial slot 42 (see Fig. 3) which receives a drive pin 42 projecting rearwardly into the slot and rigidly secured to the hemispherical head 34 of the bolt 32. The adjacent faces of the drive plate 40 and the head 34 are in spaced relation, at least at regions lying outwardly from the axes of the shaft 10 and bolt 32, sufficiently to enable the bolt 32 to incline in various directions about the effective center of the hemispherical head. The slot and pin could be reversed in position if desired, i. e. pin on crank disc and slot in hemispherical head.

It will be seen that the pin, slot and ball driving connection above described constitutes a universal joint driving coupling for the drive shaft and the bolt or stub shaft 32, by reason of which coupling the driven member (bolt 32) cannot move axially away from the driving element (shaft 10) although the outer end of the driven element is enabled to move freely in various lateral directions. The bolt 32 is prevented from moving inwardly (toward the drive shaft) by a nut 45 lying in a counterbore of the head of the drive arm and in close relation to the shoulder or bottom of the counterbore when the nut or an underlying washer 45' is forced against a shoulder 46 of the bolt 32 adjacent the serrations 33.

With the nut 45 (or such washer under the nut) seated on said shoulder 46 of the bolt the ramp or cam surfaces 30 and 31 are held in light contact in the position of parts shown by Fig. 1; and, were it not for the fact that the bolt can pivot at its inner end about the ball and socket center, even a slight obliqueness of the surfaces 30 and 31 would lock the drive arm against swinging movement. However, as the drive shaft 10 is rotated the bolt 32 is inclined compensatingly in directions required by the direction of swing of the drive arm and continues merely to maintain the cam or ramp surfaces in sliding contact and the head 27 of the drive arm moves or inclines correspondingly with the bolt. For example, the head at the end of a stroke of the drive arm in one direction from mid-position moves from the slightly inclined and off center position indicated (exaggeratedly) by the broken line at 27x, Figs. 2 and 4, through the centered position (illustrated in full lines) and into another inclined, off center position opposite that indicated by broken lines. The degree of inclination or obliqueness of the ramp or cam surfaces 30 and 31 relative to the drive shaft axis determines the amount of inclination of the bolt and head to and fro for a given swinging movement of the drive arm, hence also determines the arcuate movement of the wiper carried on the free end of the drive arm assembly. The steeper the ramp or cam the shorter will be the radius of the curve on which the wiper will be forced to move. In any case the joint between the ramp or cam surfaces remains closed to exclude entrance of foreign matter between the contacting surfaces; and, since all other working or relatively moving parts of the mechanism are fully housed by the casing, an adequate oil or other lubricant supply can be maintained on the working surfaces. The hole 37 in the member 25 through which the bolt shank portion 36 passes is larger than would be necessary in order to allow for inclining movement of the bolt 32, and the excess space is adapted to contain a supply of lubricant such as grease, or an annular body of oil wicking so as to supply both the flat and spherical mutually contacting working surfaces shown.

In order to guide the blade or wiper element 3 for wiping movement parallel to the ordinates of the curve of the surface to be wiped, a pantograph linkage on the order of that shown by Fig. 4 is usually required in conjunction with the drive arm supporting and guiding means hereof. The blade is pivoted at 50 to the arm extension 6, and a pivotal mounting piece or saddle 51 of the blade assembly carries an arm 52 extending transversely of the blade and generally parallel to the surface to be wiped. A link 53 is pivoted to the arm 52 at one end and has a fixed parallel pivot as at 54 on the casing 11, or at some other convenient point, so that, for example, as the blade is moved back and forth over the panel 2 the blade remains parallel to its original position irrespective of the amplitude of swinging movement imparted to the blade. In the case of wipping a frusto-conical surface, unless the apex of generation of the surface lies on the axis of the drive shaft 10 (in which case no pantograph mechanism would be necessary), then a pantograph linkage similar to that shown is used but with unequal fixed and movable arm lengths (52a and 52, Fig. 4) such as would not maintain parallelism between the drive arm assembly and link 53 when viewed as in Fig. 4 but would cause the blade to remain orientated with the surface to be wiped.

The axis of the bolt 34, hence of the head of the drive arm 5 becomes inclined out of parallelism with the drive shaft axis proportionate to the amplitude of swinging movement of the drive arm as such swinging movements in either direction from the mid-position toward positions at opposite sides thereof are accomplished. Axis indicating lines *a* and *b* in Fig. 2, suggestively represent, respectively, the drive shaft axis and the axis of the bolt 32 at full swung position of the drive arm in one direction say to a position such as shown in broken lines on Fig. 4. The axis *b* is approximately perpendicular to the surface portion of the panel 2 with which the portion of the blade adjacent the saddle 51 makes contact with the panel in such off center position of the drive arm and linkage 4. Since the drive arm may be assumed to have sufficient torque resistance so that the blade attaching pivot at 50 remains parallel to the axis *b* said pivot, as diagrammatically indicated at 50x, Fig. 2, will thus be seen to have maintained a uniform perpendicular or nearly perpendicular relationship to the surface to be wiped. The wiping element 3' of the blade is flexible so that a squeegee wiping action obtains and additionally the mounting strips or backing 3'' for the wiping element in the saddle 51 may enable the blade to rock back and forth as usual with windshield wipers, but the attitude of the support for the blade (saddle 51) to the curved surface remains substantially uniform for the entire stroke. Freedom of movement in the link terminal connections is provided, or for example, a free swivel joint as indicated at 55, Fig. 4 in the link 53, so that the arm 52 is unrestrained against movement toward and away from the panel 2 as required by tilting movement of the drive arm assembly.

The adjustments afforded by the three sets of spline serrations (41 on the drive shaft 10, 23 on the fixed or non-rotating ramp member 25 and at 33 between the stub shaft or bolt 32) and the drive arm 5 enable the mechanism to be adjusted for operation at various different positions around the mounting or casing 11 so that there may be some latitude in selecting the positions for the mounting bolts 12. Usually only the turned position of the driving head or disc 40 on the drive shaft and the turned position of the fixed ramp member 25 have to be taken into consideration in installing the wiper mechanism hereof in proper position for operation. Limited corrective adjustment of the drive arm on the bolt or stub shaft 32 (at splines 33) is possible if the two main adjustments are not properly made or in event one sided wiping is necessary to correct for improper curvature of the surface to be wiped.

Although not considered necessary the ramp or cam mechanism described above may include a relatively stiff compression spring (not shown) interposed between the nut 45 of the bolt 32 and the drive arm head portion 27. However, assuming such spring, neither the closed foreign-matter-excluding joint between the ramp or cam surfaces nor the arcuate movement of the blade over the curved surface to be wiped could be maintained positively; hence the spring is preferably omitted from the construction.

It may be noted that if the direction of inclination of the ramp surfaces 30 and 31 are reversed as by inclining upwardly and to the right Fig. 1 instead of upwardly and to the left the drive arm and wiper will move so as to cause the latter to remain in contact with a concave surface or, in other words, the reverse of the one shown. Thus by appropriate modification I can provide inside and outside wipers for curved surfaces actuated from a common driving mechanism or member or separate driving mechanisms or members as desired.

Referring to Fig. 5 this illustrates a different type of universal joint connection (gimbal joint 60) between the drive disc 40' and the bolt 32' and also interposition of an antifriction bearing assembly 61 between the ramp or cam surfaces 30' and 31'. The gimbal joint is provided by a drive block 62 with 90° angularly disposed sets of pins embraced in openings of yoke formations 63 and 64 on the drive plate 40' and bolt 32' respectively. The yoke formation 64 makes spherical contact at 35' with the ramp member 25' so that the gimbal joint is relieved of having to prevent endwise movement of the bolt 32'.

The bearing assembly 61 is housed in part by an annular flange 65 on the head portion of the drive arm for protection against entrance of foreign matter from outside the drive arm assembly. As illustrated the bearing assembly comprises a set of hardened balls retained in respective holes of a floating retainer plate 66, and the balls make contact with the ramp or cam surfaces 30' and 31'.

A threaded and pinned on collar 67 for the member 25' holds said member 25' in place in a supporting and attaching plate 19' corresponding to the member 19 of Figs. 1 and 2; and the members 19' and 25' have mating serrations at 23' for holding the member 25' in the desired installed position. The drive plate 40' has a suitable support, enabling its free rotation, in a circular recess formed in part by the member 25' and in part by the mounting plate 14.

I claim:

1. An arm driving mechanism including a support for an arm, an arm carried thereby, an arcuate ramp surface at one end of said support oblique to and concentric with the axis of said support, an arcuate surface on said arm complementary to said first surface, means to maintain said arcuate surfaces in substantially uniform face to face operative relationship and means to oscillate said arm through successive cycles while said surfaces guide said arm to shift the axis of oscillation thereof through successive angular positions with respect to said support.

2. The arrangement according to claim 1 wherein said first mentioned means maintain said arcuate surfaces in direct sliding contact with each other.

3. The arrangement according to claim 1 wherein the arcuate surfaces are spaced apart and friction reducing means are interposed between the arcuate surfaces in contact therewith respectively.

4. Mechanism according to claim 1 wherein the support and the portion of the arm adjacent said axis of said support are connected by a non-extensible pivot member, the longitudinal axis of which is fixed with relation to the arm, said pivot member being mounted on the support in a manner enabling inclining compensating movement of the pivot member relative to the support while restraining the pivot member against endwise movement relative to the support, whereby to maintain the arcuate surfaces in said operative relationship.

5. An arm driving mechanism comprising a supporting body, an oscillating drive shaft centrally of the body, an arm disposed for swinging movement approximately about the axis of the shaft, camming means comprising operatively adjacent circular ramp surfaces of the body and arm respectively operative to cause a free end of the arm to travel in a curved path transverse to the principal plane of swinging movement of the arm, and means connecting the drive shaft to the adjacent end of the arm in a manner to enable the shaft to transmit torque to the arm through said means along several divergent axes while preventing movement of the arm along said axes.

6. An arm driving mechanism including a normally fixed support for the arm having a planar, arcuate ramp surface inclined relative to the axis of the support and operatively engaging a follower portion of the arm adjacent a pivotal securing means for the arm, which latter means is anchored to the fixed support against movement along the axis of the support while being rotatable on the support into various divergent positions about a point on the support and inclinable to cause its axis of rotation to shift through successive angular positions with respect to said support.

7. A drive arm mounting and control means comprising a hollow body having a generally spherical socket formed therein and an opening through a wall of the body intersecting the socket, ramp surface means on the body continuously around said opening, cooperating follower surface means on the arm in operative pressure contact therewith, a member extending through said opening, connecting the arm and body and having a generally spherical head seated in the socket, a drive shaft generally aligned with the bolt adjacent said socket and a torque transmitting driving connection between the drive shaft and spherical head to rotate said head while permitting its axis of rotation to shift as guided by said ramp.

8. A mounting and control means for a swingable drive arm, said means comprising a hollow body having a generally spherical socket formed therein and an opening through a wall of the body intersecting the socket, camming means on the body adjacent said opening, cooperating cam follower means on the arm operative to cause the free end of the arm to travel in a curved path transverse to the swinging movement of the arm, a member pivotally connecting the arm and body and having a generally spherical head seated in the socket, a drive shaft generally aligned with said member and a torque transmitting driving connection between the drive shaft and spherical head to rotate said head while permitting its axis of rotation to shift as guided by said camming means.

9. In a windshield wiper mechanism a rotary drive shaft adapted to extend at one end through a wall of a body, a hollow support arranged to be secured to such body adjacent said end of the drive shaft and coaxial therewith, an oscillatable wiper drive arm adapted to carry a wiper element at its free end and having a universal driving connection with said shaft in said support, said support and arm having operatively adjacent planar ramp surfaces respectively, oblique to the axis of the hollow support and operative during turning movement of the drive shaft to shift the axis of oscillation of said wiper drive arm through successive angular positions with respect to said support and thereby to cause said wiper to follow a curved surface.

10. A windshield wiper drive arm supporting mechanism for enabling pivotal movement of the arm to move a wiper blade carried thereon in contact with a curved surface independently of assistance by said surface comprising a fixed support, an arm, means to oscillate said arm means to restrain movement of the arm along the axis of oscillation and means to shift the axis of oscillation of said arm through successive angular positions with respect to said support to maintain a substantially uniform angular relationship between a free end of said arm and the curved surface.

LEROY J. CAREY.